(12) United States Patent
Detwiler (10) Patent No.: US 8,733,651 B2
(45) Date of Patent: May 27, 2014

(54) LOW PROFILE TRI-APERTURE OPTICAL CODE SCANNER

(75) Inventor: Paul Oliver Detwiler, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/561,289

(22) Filed: Jul. 30, 2012

(65) Prior Publication Data

US 2014/0027513 A1    Jan. 30, 2014

(51) Int. Cl.
*G06K 7/00*    (2006.01)
*G06K 7/10*    (2006.01)

(52) U.S. Cl.
CPC ........ G06K 7/10574 (2013.01); G06K 7/10702 (2013.01); G06K 7/10732 (2013.01); G06K 7/10831 (2013.01); G06K 7/1096 (2013.01)
USPC ... 235/440; 235/470; 235/462.13; 235/462.4; 235/383

(58) Field of Classification Search
USPC .................................. 235/440, 462.38, 462.4
See application file for complete search history.

(56) References Cited

U.S. PATENT DOCUMENTS

| | | | |
|---|---|---|---|
| 6,536,668 B1 | 3/2003 | Detwiler et al. | |
| 2004/0232243 A1* | 11/2004 | Silverbrook et al. | 235/470 |
| 2005/0051631 A1* | 3/2005 | Hammer | 235/462.4 |
| 2006/0124745 A1* | 6/2006 | Bobba et al. | 235/462.39 |
| 2010/0282850 A1* | 11/2010 | Olmstead et al. | 235/440 |
| 2012/0284132 A1* | 11/2012 | Kim et al. | 705/20 |

* cited by examiner

*Primary Examiner* — Christopher Stanford
*Assistant Examiner* — Asifa Habib
(74) *Attorney, Agent, or Firm* — Harden E. Stevens, III; Peter H. Priest (57) ABSTRACT

A low profile tri-aperture optical code scanner and operating method are presented. The scanner includes three scanning apertures and a front and a rear low profile housing component. Each housing component includes a scanning aperture tilted toward a point about the center of the scanner. A third scanning aperture is located in a horizontal top surface of the scanner. The low profile housing elements allow an operator to scan items by standing either on the front side or the rear side of the scanner. When used in a convertible point of sale terminal, a cashier operates the scanner from the front side of the scanner when the terminal is in the assisted mode and a customer operates the scanner from the rear side of the scanner when the terminal is in the self-service mode.

23 Claims, 5 Drawing Sheets

LOW PROFILE TRI-APERTURE OPTICAL CODE SCANNER

FIELD OF THE INVENTION

The present invention relates generally to optical code scanners. More particularly, but not exclusively, it relates to a low profile tri-aperture optical code scanner that can be operated from opposite sides of the scanner.

BACKGROUND

Any discussion of prior art throughout the specification should in no way be considered as an admission that such prior art is widely known or forms part of common general knowledge in the field.

An assisted point of sale (POS) terminal is a type of POS terminal operated by a cashier to perform a purchase transaction for a customer. Customers present items for purchase and the cashier identifies each item to the POS terminal by moving the items across an optical code scanner which reads an optical code attached to or printed on each item. Optical code scanners on assisted POS terminals are optimized to scan items presented by the operator from the front or operator side of the scanner. The customer stands on the opposite or rear side of the scanner.

A self-service point of sale terminal is a type of POS terminal operated by a customer to perform a purchase transaction for the customer. The customer presents items for purchase and identifies each item to the POS terminal by moving them across an optical code scanner which reads an optical code attached to or printed on each item. The front side of the optical code scanner on a self-service POS terminal is oriented toward the customer.

Large retail stores typically use both assisted and self-service POS terminals to perform purchase transactions. During peak customer checkout periods, there are usually not enough cashiers available to operate all the assisted POS terminals. Therefore, a number of assisted POS terminals sit unused while customers wait in lines to be checked out. The customer's extended wait time can negatively affect their shopping experience and reduce the stores return on investment for the terminals. Both the assisted and self-service POS terminals may typically use a bi-optic style optical code scanner that is designed to be operated from only one side. Therefore, any attempt to operate such an assisted POS terminal as a self-service POS terminal would not work without physically rotating the optical code scanner. This adds cost, complexity and requires additional training for the personnel.

SUMMARY OF THE INVENTION

Thus, among its several aspects, the present invention recognizes there is an advantage to being able to utilize all the assisted POS terminals by temporally converting them to self-service POS terminals during peak times without having to rotate the optical code scanner.

Among its several aspects, the present invention seeks to overcome or ameliorate at least one of the disadvantages of the prior art, or to provide a useful alternative.

Among its several aspects, one embodiment of the present invention recognizes a condition where a point of sale (POS) terminal is required to operate as both an assisted terminal using a cashier to operate the terminal and as a self-service terminal where a customer operates the terminal. The two modes of operating the POS terminal require an optical code scanner that can be operated from opposite sides (from the front side by the cashier and from the rear side by the customer). One aspect of the present invention provides a low profile three aperture optical code scanner that can be operated from either the front side (cashier) or the rear side (customer) without being mechanically reconfigured or rotated. Optical code scanning is performed through each of the three window apertures. One of the apertures is a horizontal aperture located within a top surface of the scanner. There are two vertical housing components that extend a short distance above the top surface of the scanner, one of the vertical housing components is located along the front top side of the scanner and the other vertical housing component is located along the rear top side of the scanner. Each of the vertical housing components includes one of the remaining two scanning apertures. The two vertical housing components do not substantially impede an operator, standing on either side of the scanner, from moving items across the scanner for scanning.

In accordance with an embodiment of the present invention, there is provided a low profile tri-aperture optical code scanner that can be operated from either the front side or the rear side of the scanner by a cashier or a customer. The cashier or the customer operates the optical code scanner by manually moving items for scanning across the top surface of the scanner. To this end, a scanner may suitably comprise: a housing including a first surface containing a first aperture, a second surface different from the first surface containing a second aperture and a third surface different from the first and second surfaces containing a third aperture; a first laser and a second laser each located within the housing where the first laser produces a first laser beam and the second laser produces a second laser beam.

The scanner may further suitably comprise: a rotatable polygon spinner having at least three mirrored facets that reflect the first laser beam and second laser beam in a plurality of directions to produce a plurality of scanning beams including a first group of scanning beams produced by the first laser beam and a second group of scanning beams produced by the second laser beam; a first plurality of pattern mirrors that direct portions of the first group of scanning beams through the first aperture and the second aperture; and a second plurality of pattern mirrors that direct portions of the second group of scanning beams through the second aperture and the third aperture.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawings, figures and charts.

DETAILED DESCRIPTION

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

As used herein, the term optical code includes machine-readable indicia that includes, but are not limited to, one-dimensional (1D) barcodes and two-dimensional (2D) barcodes.

Figure 1:
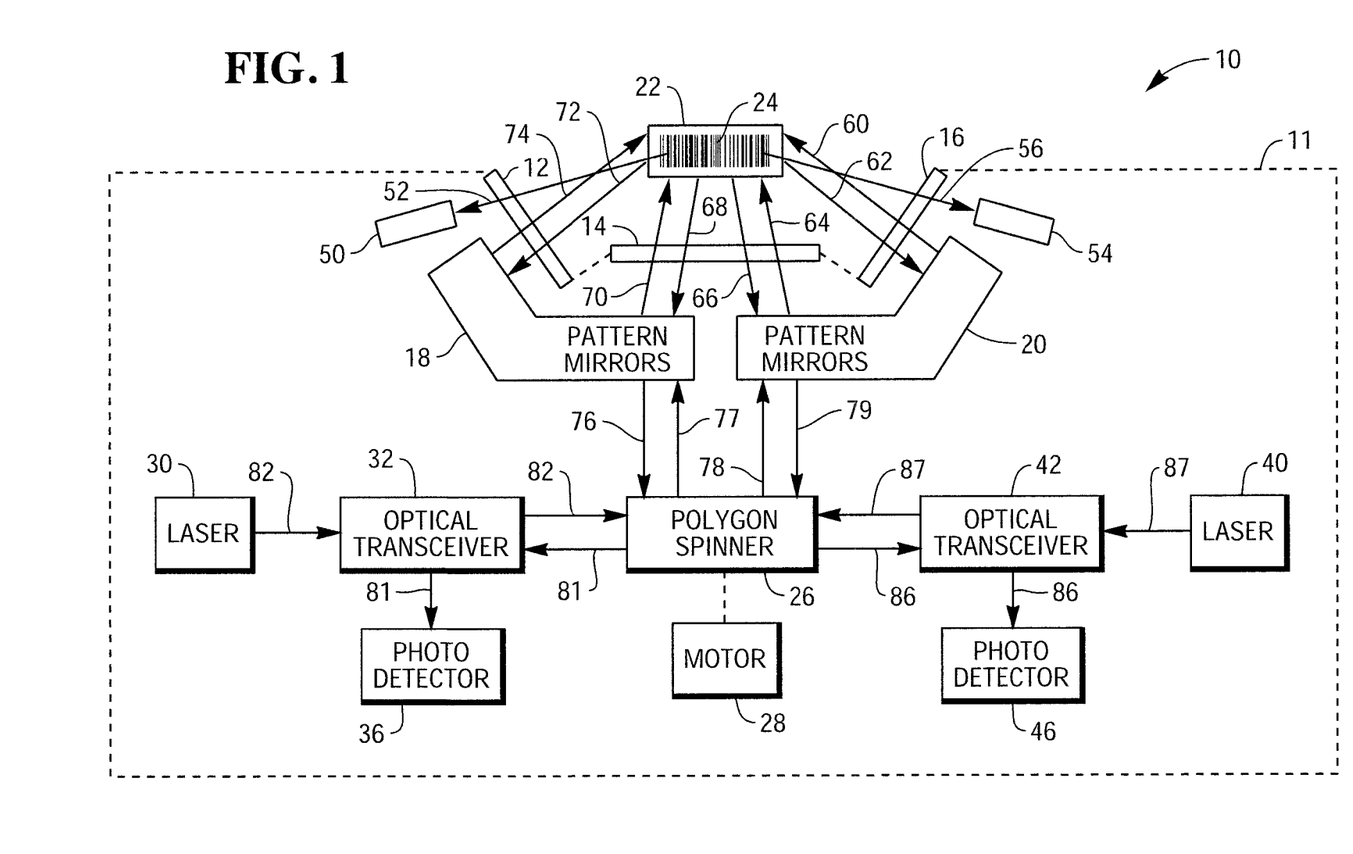
FIG. 1 is a high-level drawing illustrating an exemplary embodiment of a low profile tri-aperture optical code scanner of the present invention.

Referring now to FIG. 1, there is provided a high-level block diagram illustrating an exemplary embodiment of a low profile tri-aperture optical code scanner 10 ("scanner") of the present invention. The scanner 10 includes a housing 11, a first laser 30, a first optical transceiver 32, a first photodetector 36, a first plurality of pattern mirrors 18 and a motor 28 that rotates a mirrored polygon spinner 26. The scanner 10 further includes a second laser 40, a second optical transceiver 42, a second photodetector 46 and a second plurality of pattern mirrors 20.

The first laser 30 and the second laser 40 each include a laser diode, a focusing lens or lenses and a collimating aperture. The first optical transceiver 32 passes a laser beam 82 emitted by the first laser 30 through to the spinner 26 and directs a first reflected light 81 received from the spinner 26, where the first reflected light 81 is reflected from an item 22 having a bar code 24, to the first photodetector 36. The first optical transceiver 32 is preferably a mirror with an aperture through which the laser beam 82 passes but reflected light 81 received from the spinner 26 is directed to the first photodetector 36.

Figure 2:
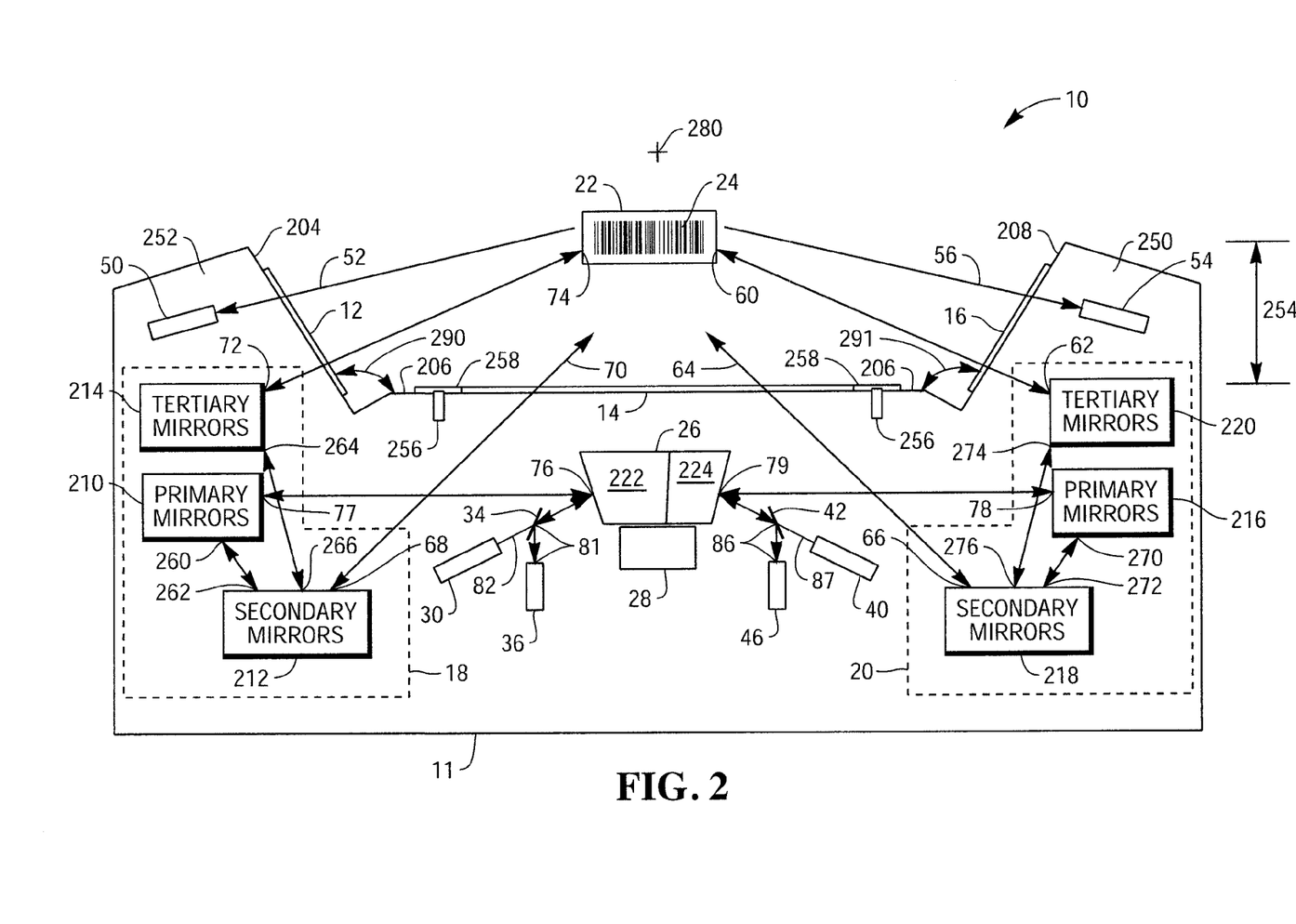
FIG. 2 is a high-level cross sectional drawing illustrating the exemplary embodiment of the low profile tri-aperture optical code scanner.

The spinner 26 is a polygon that includes a plurality of mirrored facets (sides) (FIG. 2, elements 222, 224 illustrate two facets). In this embodiment, the spinner 26 has six (6) mirrored facets. Other embodiments use a different number of mirrored facets. Each mirrored facet of the spinner 26 is offset at a different distinct vertical tilt angle as measured between the plane of the facet and the axis of rotation. The laser beam 82 reflects off of each of the six facets of the rotating spinner 26 which creates a set of scanning beams 77. Scanning beams 77 include a fan of six laser beams where each laser beam is generated by reflecting off of one of the six facets and the distance between the individual laser beams is determined in part by the different distinct vertical angles of each mirrored facet of the spinner 26.

Scanning beams 77 impact the first plurality of pattern mirrors 18 which separates the laser beams into a first sub-group of scanning beams 74 that are directed through a first aperture 12 in the housing 11 and into a second sub-group of scanning beams 70 that are directed through a second aperture 14 in the housing 11. Both sub-groups of scanning beams 70,74 scan the bar code 24 on item 22 which is located above the center of the scanner 10.

Reflected light 72 is generated when the first sub-group of scanning beams 74 scans the bar code 24. Reflected light 68 is generated when the second sub-group of scanning beams 70 scans the bar code 24. The first pattern mirrors 18 direct reflected light 72 and reflected light 68 to the spinner 26 as reflected light 76. The spinner 26 directs reflected light 76 as reflected light 81 that is directed to the first photodetector 36 which converts the received light to electrical signals that are used to decode the bar code 24.

The second optical transceiver 42 passes a laser beam 87 emitted by the second laser 40 through to the spinner 26 and directs reflected light 86 received from the spinner 26, where reflected light 86 is reflected from the item 22 having the bar code 24, to the second photodetector 46. The second optical transceiver 42 is preferably a mirror with an aperture through which the laser beam 87 passes but reflected light 86 received from the spinner 26 is directed to the second photodetector 46 which converts the received light to electrical signals that are used to decode the bar code 24.

The laser beam 87 reflects off the six facets of the rotating spinner 26 creating a second set of scanning beams 78. Scanning beams 78 include a fan of six laser beams where each laser beam is generated by reflecting laser beam 87 off of one of the six facets and the distance between the laser beams is determined in part by the different distinct vertical angles of each mirrored facet of the mirrored spinner 26.

Scanning beams 78 impact the second plurality of pattern mirrors 20 which separates the beams into a third sub-group of scanning beams 64 that are directed through the second aperture 14 in the housing 11 and into a forth sub-group of scanning beams 60 that are directed through a third aperture 16 in the housing 11. Both the third and forth sub-groups of scanning beams 60,64 scan the bar code 24 on item 22.

Reflected light 66 is generated when the third sub-group of scanning beams 64 scans the bar code 24. Reflected light 62 is generated when the forth sub-group of scanning beams 60 scans the bar code 24. The pattern mirrors 20 direct reflected light 66 and reflected light 62 to the spinner 26 as reflected light 79. The spinner 26 directs reflected light 79 as reflected light 86 that is directed to the photodetector 46.

Figure 4:
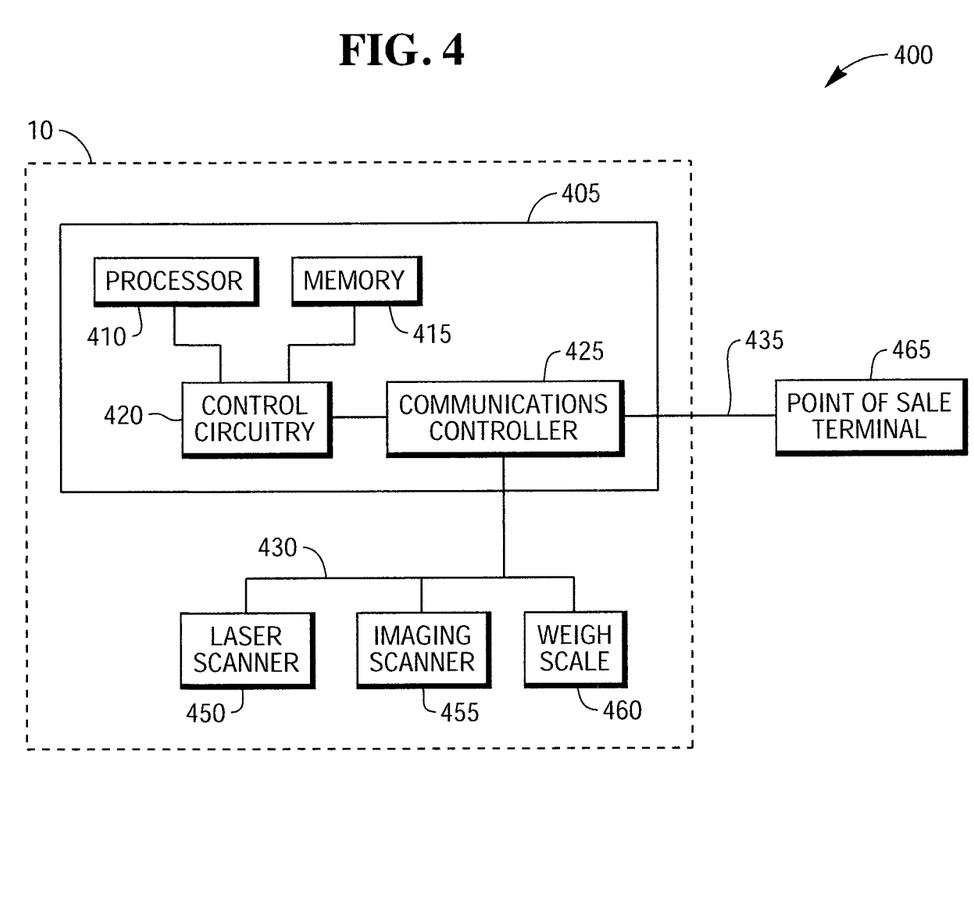
FIG. 4 is a high-level block diagram illustrating selected electrical components of the low profile tri-aperture optical code scanner and a point of sale terminal.

In some embodiments, the optical code scanner 10 includes an imaging scanner (FIG. 4, 455). The image scanner 455 includes a first image capture device 50 and a second image capture device 54. Each image capture device 50,54 uses a CMOS sensor to capture received images 52,56 of the bar code 24 which are then processed to decode (read) the bar code 24. Each image capture device 50,54 includes a plurality of illumination devices that produce and direct light to the field of view of the image capture device. In some embodiments, the illumination devices are positioned away from the image capture devices 50,54 to minimize specular and other types of reflections that reduce the ability to read an optical code from a captured image.

FIG. 2 is a high-level cross sectional drawing illustrating an exemplary embodiment of the optical code scanner 10. The housing 11 has a top surface 206 that is horizontal and substantially at the same height as external surfaces surrounding the scanner 10. The external surrounding surfaces are part of a checkout stand of a POS terminal (FIG. 4, 465) and are used to move items to the scanner 10 for scanning and to take away items after scanning. In some embodiments, conveyor belts are used to move items to the scanner 10 and to take away items after scanning.

The housing 11 is configured to have a rear vertical housing component 252 and a front vertical housing component 250. Both of the vertical housing components 250,252 extend the same distance above the top surface 206. In this embodiment, the vertical housing components 250,252 have a height 254 of above the top surface 206 that is 3" or less. In other embodiments, the height will vary but the top of vertical housing components 250,252 are not sufficiently high as to substantially interfere with or impede an operator, standing on either side of the scanner, from moving items across the scanner 10 for scanning.

The rear vertical housing component 252 includes a first side surface 204 that extends from the rear side of the top surface 206 upward and away from the top surface 206 at an angle 290 that is greater than 90°. The front vertical housing component 250 includes a second side surface 208 that extends from the front side of the top surface 206 upward and away from the top surface 206 at an angle 291 that is greater than 90°.

Additionally, the housing 11 has three apertures 12,14,16 through which outgoing scanning beams 74,70,64,60 pass and incoming reflected light 72,68,66,62 pass. Each of the apertures 12,14,16 are filled with a material that is optically transparent to the scanning beams and that will resist damaged during normal scanning operations. In some embodiments, tempered glass is used as the material that fills each aperture.

The second aperture 14 is substantially horizontal and located in the top surface 206 of the housing 11. The first aperture 12 is located within the first side surface 204 of the rear vertical housing component 252 and is tilled at an angle toward a point 280 located above the center of the optical code scanner 10. The third aperture 16 is located within the second side surface 208 of the front vertical housing component 250 and is tilled toward the point 280 above the center of the optical code scanner 10.

In some embodiments, the optical code scanner 10 includes an item weigh scale 256. In these embodiments, the weigh scale 256 includes a weigh plate 258 located within the top surface 206. In these embodiments, the second aperture 14 is located within the weigh plate 258. The weigh scale 256 determines the weight of an item placed on the transparent material of the second aperture 14 or on the weigh plate 258.

The first plurality of pattern mirrors 18 includes a set of first primary mirrors 210, a set of first secondary mirrors 212 and a set of first tertiary mirrors 214. Scanning beams 77 strike the first primary mirrors 210 and are directed to the first secondary mirrors 212 (path 262). The first secondary mirrors 212 separate the scanning beams 77 into the first sub-group of scanning beams 74 and the second sub-group of scanning beams 70. The first sub-group of scanning beams 74 is directed to the first tertiary mirrors 214 (path 264) and through the first aperture 12. The second sub-group of scanning beams 70 is directed through the second aperture 14.

Reflected light 72 passes through the first aperture 12 and is directed by the first tertiary mirrors 214 along path 266 to the first secondary mirrors 212 which directs the reflected light 72 to the first primary mirrors 210 along path 260. Reflected light 68 passes through the second aperture 14 and is directed by the first secondary mirrors 212 along path 260 to the first primary mirrors 210. The first primary mirrors 210 direct both reflected light 72 and reflected light 68 to the spinner 26 as reflected light 76.

The second plurality of pattern mirrors 20 includes a set of second primary mirrors 216, a set of second secondary mirrors 218 and a set of second tertiary mirrors 220. Scanning beams 78 strike the second primary mirrors 216 and are directed to the second secondary mirrors 218 (path 272). The second secondary mirrors 218 separate scanning beams 78 into the third sub-group of scanning beams 64 and the forth sub-group of scanning beams 60. The third sub-group of scanning beams 64 is directed through the second aperture 14. The forth sub-group of scanning beams 60 is directed to the second tertiary mirrors 220 (path 274) and through the third aperture 16.

Reflected light 62 passes through the third aperture 16 and is directed by the second tertiary mirrors 220 along path 276 to the second secondary mirrors 218 which directs the reflected light 62 to the second primary mirrors 216 along path 270. Reflected light 66 passes through the second aperture 14 and is directed by the secondary mirrors 212 along path 260 to the second primary mirrors 216. The second primary mirrors 216 direct both reflected light 62 and reflected light 66 to the spinner 26 as reflected light 79.

In some embodiments, the scanner 10 includes sensors that detects when a person is present on the customer side of the scanner 10 and when a person is present on the cashier side of the scanner 10. This information is transmitted to the POS terminal 465. Software running on the POS terminal 465 uses the information from the sensors to automatically switch between the customer self-service mode and cashier assisted mode of operation if the software is configured to automatically switch modes. The sensors can be motion detectors, infrared sensors or images from the imaging scanner 455 can be processed to determine if a person present. The POS software does not switch modes during a purchase transaction or while an cashier is logged into the POS terminal 465.

Figure 3:
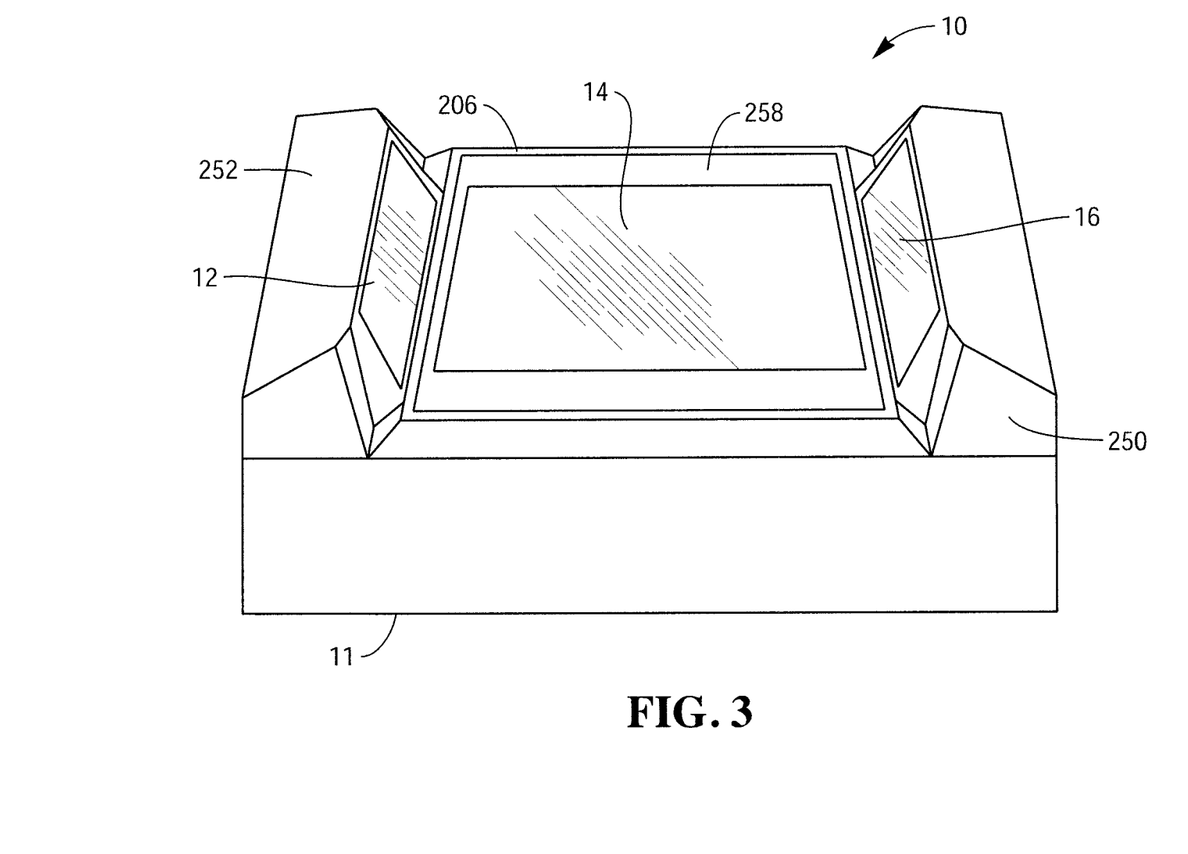
FIG. 3 is a 3D drawing illustrating the exemplary embodiment of the low profile tri-aperture optical code scanner.

FIG. 3 is a 3D drawing illustrating an exemplary embodiment of the optical code scanner 10. The front vertical housing component 250 and the rear housing vertical component 252 are low profile components that do not substantially interfere with or impede an operator, standing on either side of the scanner, from picking up and moving items across the scanner 10 for scanning. The scanner 10 is designed so that an operator can pick up and scan items from either the front or rear of the scanner 10. This allows the scanner 10 to be used in a point of sale terminal that can be converted from an assisted (cashier) mode of operation to a customer self-service mode of operation.

No physical changes or movements are made to the scanner 10 when the assisted service POS terminal is converted between the two modes of operation. In a typical assisted service point of sale terminal designed to switch between assisted and self-service operating modes, changing between the two modes is accomplished by signaling the software running the POS terminal to switch between the two modes of operation.

Turning to FIG. 4, a high-level block diagram illustrating an optical code scanning system 400 is shown. The scanner 10 includes a processing module 405, a laser scanner interface 450, an imaging scanner interface 445 and the weigh scale interface 460. The processing module 405 includes a processor 410, a memory 415, control circuitry 420, and a communications controller 425. The memory 415 includes both volatile and non-volatile memory. The non-volatile memory may include flash memory or other types of solid state electronic memory. Software stored in the memory 415 is executed by the processor 410 and causes the processor 410 to control the devices and perform the functions of the scanner 10. The functions performed include reading the bar code 24 presented to the scanner 10 using laser scanning and image scanning and determining the weight of an item using the weigh scale 256. The control circuitry 420 provides an interface between the processor 410 and the memory 415 and between the processor 410 and the communications controller 425.

The communications controller 425 includes hardware and software required to communicate with external devices, such as the point of sale terminal 465, over a first computer peripheral network 435 and with internal components over a second computer peripheral network 430. In some embodiments, the first and second computer peripheral networks 430, 435 are implemented using the industry standard Universal Serial Bus (USB). In other embodiments, the first computer peripheral network 435 may include wired or wireless communications links or both.

The laser scanner interface 450 controls the motor 28, the first laser device 30, the second laser device 40, the first photodetector 36 and the second photodetector 46. The processor 410 uses the laser scanner interface 450 to control the laser scanning functions and to process the data received by the first photodetector 36 and the second photodetector 46 to detect the bar code 24 when it is scanned. The processor 410 further uses the laser scanner interface 450 to turn the power for the first laser device 30 and second laser device 40 off and on and to turn the power for the motor 28 off or on. Powering down these components saves power and extends the life of the components.

The imaging scanner interface 455 controls the first image capture device 50, the second image capture device 54 and in some embodiments, the operation (turning on and off) of the illumination devices associated with each image capture device. The processor 410 uses the imaging scanner interface 445 to control the operation of the first and second image capture devices 50, 54 including setting selectable parameters of the CMOS sensor, capturing images and receiving image data for a captured image for processing. The processor 410 also controls the operation of the illumination devices in some embodiments. In other embodiments, the imaging scanner interface 455 includes a processor that processes captured image data to read an optical code in the image data. This reduces the work load on the main processor 410.

The weigh scale interface 256 allows the processor 410 control weigh scale 256 and determines the weight of an item placed on the material that fills the second aperture 14 or weigh plate 258.

Figure 5:
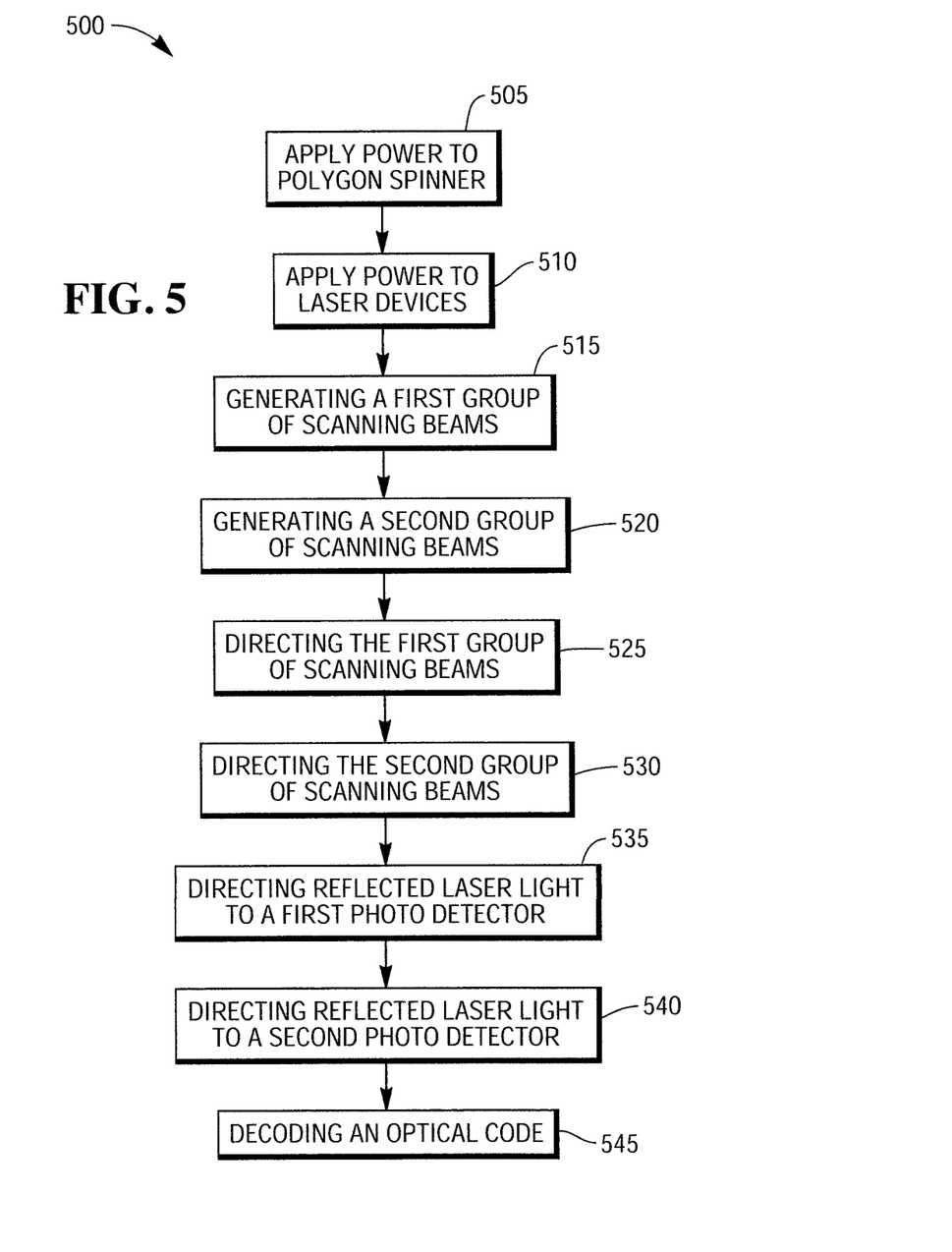
FIG. 5 is a high-level flow chart illustrating an exemplary method for operating the low profile tri-aperture optical code scanner.

Referring now to FIG. 5, there is provided a high-level flow chart illustrating an exemplary method 500 of operating the scanner 10. At step 505, the processor 410 uses the laser scanner interface 450 to apply power to the motor 28 causing the motor 28 to rotate the spinner 26. At step 510, the processor 410 uses the laser scanner interface 450 to apply power to the first laser device 30 and the second laser device 40. The powered first laser device 30 produces the laser beam 82 which is directed at the spinner 26. The powered second laser device 40 produces the laser beam 87 which is also directed at the spinner 26.

At step 515, the rotating spinner 26 generates the first group of scanning beams 77 by reflecting the first laser beam 82 off of each of the mirrored facets of the spinner 26. In the present embodiment, the spinner 26 has six mirrored facets, each positioned at a distinct angle on the spinner 26 and to the path of the first laser beam 82. The first group of scanning beams 77 includes a fan of six laser beams generated by the first laser beam 82 reflecting off of each of the six mirrored facets as they rotate into the path of the first laser beam 82. Each facet produces one of the fan's six laser beams. The rotation of the polygon spinner 26 through an angle of about sixty degrees moves one of the mirrored facets completely through the path of the first laser beam 82. Each of the six laser beams that comprise the first group of scanning beams 77 is reflected by the spinner 26 through a 60 degree arc across the first plurality of pattern mirrors 18.

At step 520, the rotating spinner 26 generates the second group of scanning beams 78 by reflecting the second laser beam 87 off each of the mirrored facets of the spinner 26. In the present embodiment, the spinner 26 has six mirrored facets, each positioned at a distinct angle on the spinner 26 and to the path of the second laser beam 87. The second group of scanning beams 78 includes a fan of six laser beams generated by the second laser beam 87 reflecting off of each of the six mirrored facets as they rotate into the path of the second laser beam 87. Each facet produces one of the fan's six laser beams. The rotation of the spinner 26 through an angle of about sixty degrees moves one of the mirrored facets completely through the path of the second laser beam 87. Each of the six laser beams that comprise the second group of scanning beams 78 is reflected by the spinner 26 through a 60 degree arc across the second plurality of pattern mirrors 20.

At step 525, the first group of scanning beams 77 is received by the first plurality of pattern mirrors 18 which separates the scanning beams 77 into the first sub-group of scanning beams 74 and the second sub-group of scanning beams 70. Each laser beam in the first group of scanning beams 77 is reflected by the spinner 26 through a sixty degree arc that moves the beams across two of the mirrors in the first plurality of pattern mirrors 18. The two mirrors are mounted at different angles and reflect half the arc of each laser beam in the first group of scanning beams 77 as they move through the sixty degree arc. The two mirrors separate scanning beam 77 into the first sub-group of scanning beams 74 and the second sub-group of scanning beams 70 and directs them to different areas, as discussed below. In other embodiments, more than two mirrors are used to separate scanning beams 74.

The first sub-group of scanning beams 74 is directed through the first aperture 12 to the item 22 located above the center of the second aperture 14. The second sub-group of scanning beams 70 is directed through the second aperture 14 to the item 22. The second sub-group of scanning beams 70 is directed upward through the second aperture 14 in a direction generally toward the front of the scanner 10.

The first plurality of pattern mirrors 18 includes the first primary mirrors 210 which receives the first group of scanning beams 77 and directs them to the first secondary mirrors 212. The first secondary mirrors 212 separate the first group of scanning beams 77 into: 1) the first sub-group of scanning beams 74 and direct them to the first tertiary mirrors 214 over path 264, and 2) the second sub-group of scanning beams 70 and direct them through the second aperture 14. The first sub-group of scanning beam 74 is directed through the first aperture 12 by the first tertiary mirrors 214.

At step 530, the second group of scanning beams 78 is received by the second plurality of pattern mirrors 20 which separates the scanning beams 78 into the third sub-group of scanning beams 64 and the forth sub-group of scanning beams 60. Each laser beam in the second group of scanning beams 78 is reflected by the spinner 26 through a sixty degree arc that moves the beams across two of the mirrors in the second plurality of pattern mirrors 20. The two mirrors are mounted at different angles and reflect half the arc of each laser beam in the second group of scanning beams 78 as they move through the sixty degree arc. The two mirrors separate scanning beam 78 into the third sub-group of scanning beams 64 and the forth sub-group of scanning beams 60 and directs them to different areas, as discussed below. In other embodiments, more than two mirrors are used to separate scanning beams 78.

The forth sub-group of scanning beams 60 is directed through the third aperture 16 to the item 22 located above the center of the second aperture 14. The third sub-group of scanning beams 64 is directed through the second aperture 14 to the item 22. The third sub-group of scanning beams 64 is directed upward through the second aperture 14 in a direction generally toward the rear of the scanner 10.

The second plurality of pattern mirrors 20 includes the second primary mirrors 216 which receives the second group of scanning beams 78 and directs them to the second secondary mirrors 218. The second secondary mirrors 218 separates the second group of scanning beams 78 into the forth sub-group of scanning beams 60 and directs them to the second tertiary mirrors 220 over path 274 and into the third sub-group of scanning beams 64 and directs them through the second aperture 14. The forth sub-group of scanning beams 60 is directed through the third aperture 16 by the second tertiary mirrors 220.

At step 535, the first sub-group of scanning beams 74 and second sub-group of scanning beams 70 strike the optical code 24 on item 22 and light is reflected back to the polygon spinner 26 and to the first optical transceiver 32 along path 81. The first optical transceiver 32 directs the reflected light 81 to the first photodetector 36. The first photodetector 36 converts the received reflected light to electrical signals that represent the intensity of the received reflected light which is used to read the optical code 24.

At step 540, the third sub-group of scanning beams 60 and forth sub-group of scanning beams 64 strike the optical code 24 on item 22 and light is reflected back to the spinner 26 and to the second optical transceiver 42 along path 86. The second optical transceiver 42 directs the reflected light 86 to the second photodetector 46. The second photodetector 46 converts the received reflected light to electrical signals that represent the intensity of the received reflected light which is used to read the optical code 24.

At step 545, the processor 410 uses the laser scanner interface 450 to receive the electrical signals from the first photodetector 36 and the second photodetector 46. The processor 410 processes the received electrical signals to detect and decode the optical code 24.

Although particular reference has been made to an embodiment that includes a low profile tri-aperture optical code scanner integrated into a point of sale terminal and examples have been provided illustrating the invention, certain other embodiments, variations and modifications are also envisioned within the spirit and scope of the following claims.

I claim:

1. A low profile optical code scanner that can be operated from opposite sides of the scanner, the scanner comprising:
   a housing including a first surface containing a first aperture, a second surface different from the first surface containing a second aperture and a third surface different from the first and second surfaces containing a third aperture, the first, second and third apertures allowing scanning beams to pass out through the housing and incoming reflected light to pass in through the housing;
   a first laser and a second laser each located within the housing where the first laser produces a first laser beam and the second laser produces a second laser beam;
   a rotatable polygon spinner having at least three mirrored facets that reflect the first laser beam and second laser beam in a plurality of directions to produce a plurality of scanning beams including a first group of scanning beams produced by the first laser beam and a second group of scanning beams produced by the second laser beam;
   a first plurality of pattern mirrors that direct portions of the first group of scanning beams through the first aperture and the second aperture; and
   a second plurality of pattern mirrors that direct portions of the second group of scanning beams through the second aperture and the third aperture.

2. The scanner of claim 1, wherein the first plurality of pattern mirrors includes a set of first primary mirrors, a set of first secondary mirrors and a set of first tertiary mirrors and wherein the second plurality of pattern mirrors includes a set of second primary mirrors, a set of second secondary mirrors and a set of second tertiary mirrors.

3. The scanner of claim 2, wherein the set of first primary mirrors reflects the first group of scanning beams to the first secondary mirrors separating the first group of scanning beams and reflecting a portion of the first group of scanning beams through the second aperture and reflecting another portion of the first group of scanning beams to the first tertiary mirrors which directs them through the first aperture and wherein the set of second primary mirrors reflects the second group of scanning beams to the second secondary mirrors separating the second group of scanning beams and reflecting a portion the second group of scanning beams through the second aperture and reflecting another portion of the second group of scanning beams to the second tertiary mirrors which directs them through the third aperture.

4. The scanner of claim 1, wherein the second surface is a top surface of the housing and the second aperture located there within is substantially horizontal and wherein the first and third apertures are located on opposite sides of the second aperture in low profile housing components and each aperture extends upward and away from the second aperture at an angle greater than 90° from the second aperture.

5. The scanner of claim 4, further comprising a weigh scale including a weigh plate integrated into the second surface where the second aperture is located within the weigh plate and where the weigh scale determines the weight of items placed on the second aperture.

6. The scanner of claim 1, further comprising:
   a first photodetector that converts reflected laser light from the first laser into electric signals used to decode a scanned optical code; and
   a second photodetector that converts reflected laser light from the second laser into electric signals used to decode a scanned optical code.

7. The scanner of claim 1, wherein the first, second and third apertures are filled with an optically transparent material.

8. The scanner of claim 1, further comprising an image capture device located in the housing for capturing an image of an optical code.

9. A method of scanning an optical code from multiple directions by a low profile optical code scanner, the method comprising the steps of:
   generating laser light;
   rotating a multi-faceted mirrored polygon spinner in a path of the laser light;
   generating a first group of scanning beams and a second group of scanning beams by reflecting the laser light off of each facet of the mirrored polygon spinner;
   directing the first group of scanning beams to a first group of pattern mirrors that direct a first portion of the first scanning beams through a first low profile aperture in a housing of the low profile optical scanner and a second portion of the first scanning beams through a second aperture in the housing where the plane of the second aperture is substantially horizontal and the plane of the first aperture extends upward and away from the rear side of the second aperture; and
   directing the second group of scanning beams to a second group of pattern mirrors that direct a first portion of the second scanning beams through a third low profile aperture in the housing and a second portion of the second scanning beams through the second aperture where the plane of the third aperture extends upward and away from the front side of the second aperture.

10. The method of claim 9, further comprising:
directing reflected laser light received through the first aperture, the second aperture and the third aperture to a photodetector that converts the laser light to electrical signals; and
decoding an optical code from the electrical signals.

11. The method of claim 9, further comprising:
receiving an image of the optical code through the first aperture; and
causing an image capture device to capture an image of the optical code.

12. The method of claim 9, further comprising:
determining the weight of an item placed on a transparent material filling the second aperture.

13. The method of claim 9, wherein the first group of pattern mirrors include a set of first primary mirrors, a set of first secondary mirrors and a set of first tertiary mirrors and wherein the second group of pattern mirrors include a set of second primary mirrors, a set of second secondary mirrors and a set of second tertiary mirrors.

14. The method of claim 13, wherein first tertiary mirrors direct the first portion of the first scanning beams through the first aperture and wherein the first secondary mirrors direct the second portion of the first scanning beams through the second aperture and wherein second tertiary mirrors direct the first portion of the second scanning beams through the third aperture and wherein the second secondary mirrors direct the second portion of the second scanning beams through the second aperture.

15. A method of scanning an item having an optical code from multiple directions by a low profile optical code scanner where the scanning operation can be performed by an operator from either the front side or the rear side of the optical code scanner, the method comprising:
arranging a housing including a rear low profile housing section having an angled first surface containing a first aperture, and a main housing section having a horizontal second surface containing a second aperture, and a front low profile housing section with an angled third surface containing a third aperture and where the rear housing section extends above the main housing section and the first aperture extends from the rear side of the second surface upward and away from the second surface and where the third housing section extends above the main housing section and the third aperture extends from the front side of the second surface upward and away from the second surface;
generating a first laser beam and a second laser beam;
rotating a single multi-faceted mirrored polygon spinner in a path of the first laser beam and in a path of the second laser beam;
generating a first set of scanning beams by reflecting the first laser beam off of the mirrored facets of the polygon spinner and across a first plurality of pattern mirrors;
generating a second set of scanning beams by reflecting the second laser beam off of the mirrored facets of the polygon spinner and across a second plurality of pattern mirrors;
directing a first portion of the first set of scanning beams through the first aperture to scan the rear and bottom sides of the item from the rear direction;
directing a first portion of the second set of scanning beams through the third aperture to scan the front and bottom sides of the item from the front direction; and
directing a second portion of the first set of scanning beams through the second aperture toward the front of the housing and a second portion of the second set of scanning beams through the second aperture toward the rear of the housing to scan the bottom side, the lower rear side, and the lower front side of the item.

16. The method of claim 15, further comprising:
directing reflected laser light received through the first aperture, the second aperture and the third aperture to a photodetector that converts the laser light to electrical signals; and
decoding an optical code from the electrical signals.

17. The method of claim 15, further comprising:
receiving an image of the optical code through the first aperture;
causing an image capture device to capture an image of the optical code; and
processing the captured image to read the optical code.

18. The method of claim 15, further comprising:
determining the weight of an item placed on a transparent material filling the second aperture.

19. A method of scanning an item having an optical code from multiple directions by a low profile optical code scanner where the scanning operation can be performed by an operator from either the front side or the rear side of the optical code scanner, the method comprising:
arranging a housing including a rear housing section having an angled first surface containing a first aperture, and a main housing section with a horizontal second surface containing a second aperture, and a front housing section with an angled third surface containing a third aperture and where the rear housing section extends above the main housing section and the first aperture extends from the rear side of the second surface upward and away from the second surface and where the third housing section extends above the main housing section and the third aperture extends from the front side of the second surface upward and away from the second surface;
generating a first laser beam and a second laser beam;
rotating a single multi-faceted mirrored polygon spinner in a path of the first laser beam and in a path of the second laser beam;
generating a first set of scanning beams by reflecting the first laser beam off each of the mirrored facets of the polygon spinner and across a first plurality of pattern mirrors where the first plurality of pattern mirrors includes a set of first primary mirrors, a set of first secondary mirrors and a set of first tertiary mirrors;
generating a second set of scanning beams by reflecting the second laser beam off each of the mirrored facets of the polygon spinner and across a second plurality of pattern mirrors where the second plurality of pattern mirrors includes a set of second primary mirrors, a set of second secondary mirrors and a set of second tertiary mirrors;
directing, using the first tertiary mirrors, a first portion of the first set of scanning beams through the first aperture to scan the rear and bottom sides of the item from the rear direction;
directing, using the second tertiary mirrors, a first portion of the second set of scanning beams through the third aperture to scan the front and bottom sides of the item from the front direction; and
directing, using the first second secondary mirrors, a second portion of the first set of scanning beams through the second aperture toward the front of the housing and using the second secondary mirrors, directing a second portion of the second set of scanning beams through the second aperture toward the rear of the housing to scan the bottom side, the lower rear side, and lower front side of the item.

20. The method of claim 19, wherein the first set of scanning beams reflected off the mirrored facets of the polygon spinner is directed to the first primary mirrors and the second set of scanning beams reflected off the mirrored facets of the polygon spinner is directed to the second primary mirrors.

21. A method of scanning an item having an optical code from multiple directions by a processor in a low profile optical code scanner where the scanning operation can be performed by an operator from either the front side or the rear side of the optical code scanner, the method comprising:

applying power to a first laser and a second laser causing the first laser to generate a first laser beam and the second laser to generate a second laser beam;

applying power to a motor that rotates a rotatable multifaceted polygon spinner in the path of the first laser beam and the second laser beam;

generating a first set of scanning beams by reflecting the first laser beam off each of the mirrored facets of the rotating polygon spinner and across a first plurality of pattern mirrors that directs a first portion of the first set of scanning beams through a first rear aperture in a housing of the scanner to scan the rear side and bottom side of the item from the rear of the scanner and directs a second portion of the first set of scanning beams through a second aperture in the housing toward the front of the scanner to scan the lower rear side and bottom side of the item;

generating a second set of scanning beams by reflecting the second laser beam off each of the mirrored facets of the rotating polygon spinner and across a second plurality of pattern mirrors that directs a first portion of the second set of scanning beams through a third front aperture in the housing to scan the front side and bottom side of the item from the front of the scanner and directs a second portion of the second set of scanning beams through the second aperture in the housing toward the rear of the scanner to scan the lower front side and bottom side of the item;

receiving reflected light directed from the item by the first plurality of pattern mirrors to the rotating polygon spinner and then to a first photodetector;

receiving reflected light directed from the item by the second plurality of pattern mirrors to the rotating polygon spinner and then to a second photodetector; and processing data from the first photodetector and the second photodetector to read the optical code.

22. The method of claim 21, further comprising the steps of:

capturing an image of the item using an image capture device; and processing the captured image to read the optical code.

23. The method of claim 21, further comprising the steps of:

determining from reading the optical code that the item is sold by weight; and receiving data from a weigh scale indicating a change in weight where the weigh scale is integrated into the scanner; and determining the weight of the item from received data.

* * * * *